United States Patent
Vijay

(10) Patent No.: US 9,094,408 B2
(45) Date of Patent: Jul. 28, 2015

(54) METHOD FOR RECORDING EVENTS IN AN IP NETWORK

(71) Applicant: VERIZON BUSINESS GLOBAL LLC, Basking Ridge, NJ (US)

(72) Inventor: Sharadha Vijay, Cedar Rapids, IA (US)

(73) Assignee: Verizon Business Global LLC, Lake Mary, FL (US)

( * ) Notice: Subject to any disclaimer, the term of this patent is extended or adjusted under 35 U.S.C. 154(b) by 366 days.

(21) Appl. No.: 13/746,878

(22) Filed: Jan. 22, 2013

(65) Prior Publication Data

US 2013/0138825 A1    May 30, 2013

Related U.S. Application Data

(62) Division of application No. 10/023,297, filed on Dec. 17, 2001, now Pat. No. 8,380,840.

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
*G06F 15/173* (2006.01)
*H04L 29/06* (2006.01)
(Continued)

(52) U.S. Cl.
CPC ............ *H04L 65/1006* (2013.01); *H04L 12/14* (2013.01); *H04L 12/1403* (2013.01); *H04L 12/1446* (2013.01); *H04L 12/24* (2013.01); *H04L 29/06027* (2013.01);
(Continued)

(58) Field of Classification Search
CPC ... H04L 41/022; H04L 41/0226; H04L 29/06; H04L 67/025; H04L 7/0087; H04L 29/08756
USPC ........................................ 709/224, 246, 248
See application file for complete search history.

(56) References Cited

U.S. PATENT DOCUMENTS 4,979,207 A    12/1990    Baum et al.
5,027,388 A    6/1991    Bradshaw et al.
(Continued)

FOREIGN PATENT DOCUMENTS

EP             1202528       5/2002
WO         WO 00/52916 A1    9/2000
WO         WO 02075559 A1    9/2002

OTHER PUBLICATIONS

Lennox et al., "Implementing Intelligent Network Services with the Session Initiation Protocol," Columbia University Technical Report, CUCS-002-99, Jan. 1999.
(Continued)

*Primary Examiner* — Michael Y Won

(57) ABSTRACT

The present invention relates to a method for capturing call events and other information in a platform independent way. The method includes generating call event records in response to a SIP call events. A call event file is created that includes all the call event records collected by a server over a predetermined period of time. The call event file is an XML document that includes generic, uniformly formatted records that can be read by any network device equipped with an XML parser. XML documents include embedded instructions that enable a receiving computer to decode the records without needing a special proprietary interface.

20 Claims, 3 Drawing Sheets

(51) Int. Cl.
| | |
|---|---|
| *H04L 12/14* | (2006.01) |
| *H04L 12/24* | (2006.01) |
| *H04L 29/12* | (2006.01) |
| *H04L 12/801* | (2013.01) |
| *H04L 12/803* | (2013.01) |
| *H04L 12/851* | (2013.01) |
| *H04M 3/22* | (2006.01) |
| *H04M 7/00* | (2006.01) |
| *H04M 15/00* | (2006.01) |
| *H04M 15/06* | (2006.01) |
| *H04Q 3/00* | (2006.01) |
| *H04L 29/08* | (2006.01) |

(52) U.S. Cl.
CPC ..... *H04L 29/1216* (2013.01); *H04L 29/12094* (2013.01); *H04L 41/00* (2013.01); *H04L 47/10* (2013.01); *H04L 47/125* (2013.01); *H04L 47/2408* (2013.01); *H04L 47/2433* (2013.01); *H04L 47/2441* (2013.01); *H04L 61/157* (2013.01); *H04L 61/1523* (2013.01); *H04L 61/1529* (2013.01); *H04L 63/1416* (2013.01); *H04L 65/103* (2013.01); *H04L 65/104* (2013.01); *H04L 65/1043* (2013.01); *H04L 65/1069* (2013.01); *H04L 65/1096* (2013.01); *H04L 65/4084* (2013.01); *H04L 65/602* (2013.01); *H04L 67/16* (2013.01); *H04L 67/303* (2013.01); *H04L 67/306* (2013.01); *H04L 67/34* (2013.01); *H04M 3/2218* (2013.01); *H04M 7/006* (2013.01); *H04M 15/00* (2013.01); *H04M 15/06* (2013.01); *H04M 15/41* (2013.01); *H04M 15/43* (2013.01); *H04M 15/44* (2013.01); *H04M 15/49* (2013.01); *H04M 15/51* (2013.01); *H04M 15/52* (2013.01); *H04M 15/53* (2013.01); *H04M 15/55* (2013.01); *H04M 15/58* (2013.01); *H04M 15/63* (2013.01); *H04M 15/745* (2013.01); *H04M 15/8214* (2013.01); *H04M 15/8292* (2013.01); *H04Q 3/0029* (2013.01); *H04L 69/08* (2013.01); *H04L 69/329* (2013.01); *H04M 2215/0104* (2013.01); *H04M 2215/0108* (2013.01); *H04M 2215/0164* (2013.01); *H04M 2215/0168* (2013.01); *H04M 2215/0172* (2013.01); *H04M 2215/0176* (2013.01); *H04M 2215/0188* (2013.01); *H04M 2215/2013* (2013.01); *H04M 2215/2046* (2013.01); *H04M 2215/22* (2013.01); *H04M 2215/46* (2013.01); *H04M 2215/54* (2013.01); *H04M 2215/782* (2013.01)

(56) References Cited

U.S. PATENT DOCUMENTS

| | | | |
|---|---|---|---|
| 5,565,316 | A | 10/1996 | Kershaw et al. |
| 5,579,379 | A | 11/1996 | D'Amico et al. |
| 5,812,668 | A | 9/1998 | Weber |
| 5,827,070 | A | 10/1998 | Kershaw et al. |
| 5,867,495 | A | 2/1999 | Elliott et al. |
| 6,016,343 | A | 1/2000 | Hogan et al. |
| 6,122,359 | A | 9/2000 | Otto et al. |
| H001897 | H | 10/2000 | Fletcher et al. |
| 6,134,307 | A | 10/2000 | Brouckman et al. |
| 6,151,624 | A | 11/2000 | Teare et al. |
| 6,233,248 | B1 | 5/2001 | Sautter et al. |
| 6,282,193 | B1 | 8/2001 | Hluchyj et al. |
| 6,311,186 | B1 | 10/2001 | MeLampy et al. |
| 6,377,672 | B1 | 4/2002 | Busuioc |
| 6,377,939 | B1 | 4/2002 | Young |
| 6,418,467 | B1 | 7/2002 | Schweitzer et al. |
| 6,466,971 | B1 | 10/2002 | Humpleman et al. |
| 6,490,564 | B1 | 12/2002 | Dodrill et al. |
| 6,499,054 | B1 | 12/2002 | Hesselink et al. |
| 6,577,718 | B1 | 6/2003 | Kalmanek et al. |
| 6,611,818 | B1 | 8/2003 | Mersky et al. |
| 6,631,186 | B1 | 10/2003 | Gibson et al. |
| 6,639,975 | B1 | 10/2003 | O'Neal et al. |
| 6,707,915 | B1 | 3/2004 | Jobst et al. |
| 6,714,992 | B1 | 3/2004 | Kanojia et al. |
| 6,718,023 | B1 | 4/2004 | Zolotov |
| 6,751,652 | B1 | 6/2004 | Thomas |
| 6,768,722 | B1 | 7/2004 | Katseff et al. |
| 6,865,681 | B2 | 3/2005 | Nuutinen |
| 6,870,845 | B1 | 3/2005 | Bellovin et al. |
| 6,895,438 | B1 | 5/2005 | Ulrich |
| 6,907,032 | B2 | 6/2005 | Eastman |
| 6,952,800 | B1 | 10/2005 | Danner et al. |
| 6,980,526 | B2 | 12/2005 | Jang et al. |
| 7,058,704 | B1 | 6/2006 | Mangipudi et al. |
| 7,076,040 | B2 | 7/2006 | Carson et al. |
| 7,136,467 | B2 | 11/2006 | Brockman et al. |
| 7,197,560 | B2 | 3/2007 | Caslin et al. |
| 7,305,081 | B1 | 12/2007 | Kalmanek et al. |
| 7,406,306 | B2 | 7/2008 | Gallant et al. |
| 8,032,489 | B2 * | 10/2011 | Villella et al. ................. 707/622 |
| 8,380,840 | B2 * | 2/2013 | Vijay ............................ 709/224 |
| 2001/0012346 | A1 | 8/2001 | Terry |
| 2001/0027420 | A1 | 10/2001 | Boublik et al. |
| 2001/0032197 | A1 | 10/2001 | Chandra et al. |
| 2001/0040886 | A1 | 11/2001 | Jimenez et al. |
| 2001/0050984 | A1 | 12/2001 | Jordan |
| 2001/0051962 | A1 | 12/2001 | Plotkin |
| 2002/0010798 | A1 | 1/2002 | Ben-Shaul et al. |
| 2002/0064149 | A1 | 5/2002 | Elliott et al. |
| 2002/0075880 | A1 | 6/2002 | Dolinar et al. |
| 2002/0090071 | A1 | 7/2002 | Book et al. |
| 2002/0095339 | A1 | 7/2002 | Galloway |
| 2002/0103898 | A1 | 8/2002 | Moyer et al. |
| 2002/0112187 | A1 | 8/2002 | Dalton et al. |
| 2002/0124100 | A1 | 9/2002 | Adams |
| 2002/0126654 | A1 | 9/2002 | Preston et al. |
| 2002/0127995 | A1 | 9/2002 | Faccinn et al. |
| 2002/0129093 | A1 | 9/2002 | Donovan et al. |
| 2002/0129236 | A1 | 9/2002 | Nuutinen |
| 2002/0160810 | A1 | 10/2002 | Glitho et al. |
| 2002/0188712 | A1 | 12/2002 | Caslin et al. |
| 2003/0028669 | A1 * | 2/2003 | Batsleer et al. ............... 709/240 |
| 2003/0074313 | A1 | 4/2003 | McConnell et al. |
| 2003/0079223 | A1 | 4/2003 | Galloway |
| 2003/0126257 | A1 | 7/2003 | Vijay |
| 2004/0078349 | A1 | 4/2004 | Syrjala et al. |
| 2007/0116232 | A1 | 5/2007 | Sprokkereef |
| 2007/0206576 | A1 | 9/2007 | Radulovic |
| 2008/0013531 | A1 | 1/2008 | Elliott et al. |
| 2008/0025295 | A1 | 1/2008 | Elliott et al. |

OTHER PUBLICATIONS

Polyzois et al., "From Pots to Pans—A Commentary on the Evolution to Internet Telephony," Mar. 26, 1999.

Sterman, "Real-Time Billing in SIP," DeltaThree, 2002, www.recursosvoip.com/docs/english/realtimebilling.pdf, 18 pages.

Kausar et al., "A Charging Model for Sessions on the Internet," Proceedings of the Fourth IEEE Symposium on Computers and Communications, pp. 32-38, Apr. 1999.

Aboda et al., "The Accounting Data Interchange Format (ADIF)," ROAMOPS Working Group, Apr. 25, 2000.

Pan et al., "DIAMETER: Policy and Accounting Extension for SIP (draft-pan-diameter-sip-01)," The Internet Society, Nov. 15, 1998.

Brownlee et al., "RFC 2924—Accounting Attributed and Record Formats," The Internet Society, Sep. 2000.

Cisco Systems, "Overview of the Session Initiation Protocol," www.cisco.com/univered/c/td/doc/product/coice/sipsols/biggulp/bisipov.htm, 1992.

Schulzrinne et al., "Signaling for Internet Telephony," Columbia University, Department of Computer Science Technical Report CUCS-005-98, Jan. 31, 1998.

Cisco Systems, "Release Note for Cisco MC3810—Software Requirement for Analog Personality Modules," Document No. 78-6053-01, 1998.

(56) References Cited

OTHER PUBLICATIONS

Usdin et al., "XML: Not a Silver Bullet, but a Great Pipe Wrench," StandardView, Sep. 1998, vol. 6, No. 3, pp. 125.

Handley et al., "SIP: Session Initiation Protocol," IETIF, Request for Comment 2543, Mar. 1999.
Schulzrinne et al., "SIP Call Control Services," IETF Internet Draft, Jun. 17, 1999.

* cited by examiner

METHOD FOR RECORDING EVENTS IN AN IP NETWORK

RELATED APPLICATIONS

This application is a divisional of U.S. patent application Ser. No. 10/023,297, filed Dec. 19, 2001, which claims priority under 35 U.S.C. §119(e) based on U.S. Provisional Application No. 60/276,923, filed Mar. 20, 2001, U.S. Provisional Application No. 60/276,953, filed Mar. 20, 2001, U.S. Provisional Application No. 60/276,954, filed Mar. 20, 2001, and U.S. Provisional Application No. 60/276,955, filed Mar. 20, 2001. The contents of all these applications are incorporated herein by reference.

BACKGROUND OF THE INVENTION

1. Field of the Invention

The present invention relates generally to telecommunications systems, and particularly to recording call event records in an IP network.

2. Technical Background

Telephony over the Internet is rapidly becoming a reality. Features that callers have come to expect from circuit switched systems are also considered essential for IP networks. One approach that is being considered to provide the system features needed to create and terminate calls in an IP network involves the Session Initiation Protocol (SIP).

SIP is an application-layer signaling protocol that has been developed to create, modify, and terminate sessions having one or more users. These sessions include Internet telephone calls, multi-media conferences, and multi-media distribution. SIP functionality is typically resident on application servers. SIP servers are configured to provide telephonic services, and process call event information. Because vendors have developed their own custom SIP application programs, call events and telephonic services are processed by each vendor's application server in a proprietary way. Unfortunately, when a network includes elements provided by a multiplicity of vendors, it becomes necessary to accommodate a variety of proprietary interfaces that enable the devices to transmit and receive call event information, billing information, monitoring information, fraud prevention data and other data.

What is needed is a platform independent method for capturing SIP related events and other data in a uniform manner. Preferably, the system and method will be extensible, providing embedded information that will enable a receiving computer to read the generic, uniformly formatted records without needing a special proprietary interface.

SUMMARY OF THE INVENTION

The present invention relates to a platform independent method for capturing SIP related events and other data in a uniform manner. The method and system of the present invention is extensible. The method of the present invention produces generic, uniformly formatted records that can be read by a receiving computer without needing a special proprietary interface.

One aspect of the present invention is a method for capturing call event data in a telecommunications network. The method includes generating at least one call event record in response to at least one event. An XML call event file is created that includes the at least one call event record.

In another aspect, the present invention includes a computer readable medium that can be used to direct a Session Initiation Protocol (SIP) server computer to function in a specified manner. The computer readable medium includes a SIP application layer software module. The SIP application layer software module is executable by the SIP server computer to provide SIP functionality. A call event record module is coupled to the SIP application layer software module. The call event record module is configured to create at least one call event record in response to at least one event. An XML processor module is coupled to the call event record module. The XML processor module is configured to create an XML call event file. The XML call event file includes the at least one call event record.

In another aspect, the present invention includes a set of application program interfaces embodied on a computer readable medium for execution on a computer. The set of application program interfaces includes a first interface that receives an event identifier and returns a call event record. The set of interfaces includes a second interface that receives a set of call event records and returns a call event file. The call event file includes the set of call event records. The call event file is an XML document written using the Extensible Markup Language (XML).

In another aspect, the present invention includes a set of application program interfaces embodied on a computer readable medium for execution on a Session Initiation Protocol (SIP) server computer in conjunction with a SIP application layer software module that provides SIP functionality. The set of application program interfaces includes a first interface that receives a SIP event identifier and returns a call event record. The set of interfaces includes a second interface that receives a set of call event records and returns a call event file. The call event file includes the set of call event records. The call event file is written using the Extensible Markup Language (XML) and the call event file is an XML document.

In another aspect, the present invention includes a communications network for establishing a communications session between a first client and a second client. The communications network includes at least one Session Initiation Protocol (SIP) server computer. The SIP server computer includes a first call event record module configured to create a call event record corresponding to an event, and a first XML processor module configured to create a first XML call event file, the first XML call event file including the call event record. At least one network system is coupled to the at least one SIP server computer. The at least one network system includes a second XML processor module, whereby the at least one network system can read the first XML call event file.

In another aspect, the present invention includes a computer-readable medium having stored thereon a data structure formatted as an XML document file. The data structure includes a server identifier section including information identifying the server that created the XML document file, a SIP message type section, and a SIP event section including information relating to a SIP message event.

In another aspect, the present invention includes a computer readable medium having computer executable instructions for performing a method. The method includes the steps of: generating at least one call event record in response to at least one event; and, creating an XML call event file including the at least one call event record.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
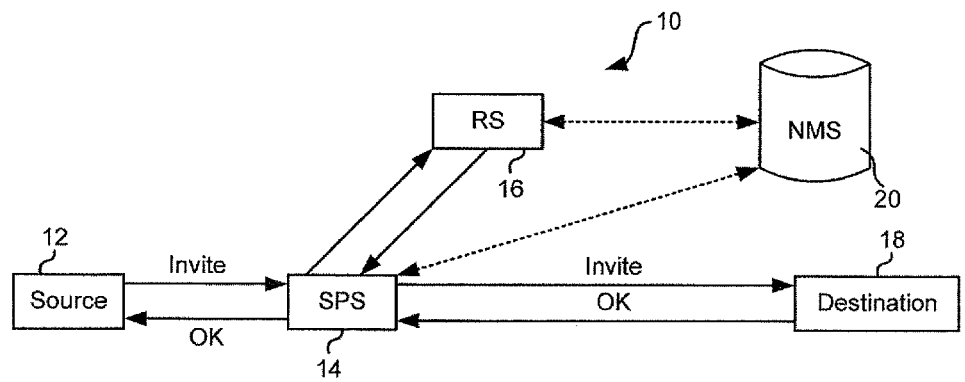
FIG. 1 is a block diagram of a communications network for establishing a communications sessions between a first user and a second user in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the communications network of the present invention is shown in FIG. 1, and is designated generally throughout by reference numeral 10.

In accordance with the invention, the present invention relates to a method for capturing call related events and messages in a telecommunications network. The method includes the step of generating a call event record in response to a call related event. A call event file is created that includes the call event record. The call event file is an XML document file. Thus, the method of the present invention is extensible and platform independent. The method captures call related SIP events and other data such that any application server can process the data in a uniform way. The present invention provides a method for providing generic, uniformly formatted records that can be read by any network device. The system and method of the present invention includes embedded instructions that enable a receiving computer to decode the records without needing a special proprietary interface.

As embodied herein, and depicted in FIG. 1, a block diagram of a communications network for establishing a communications sessions between a first client and a second client in accordance with the present invention is disclosed. IP network 10 includes source client 12 coupled to SIP proxy server (SPS) 14. Client 12 is referred to as a source client because it is the originator of the session participation request. Server 14 is coupled to SIP redirect server (RS) 16, destination client 18 and network management system (NMS) 20. Those of ordinary skill in the art will recognize that FIG. 1 is merely a representative example. The present invention supports networks including a multiplicity of devices such as voice mail servers, conferencing servers and gateway devices.

By way of example, source client 12 initiates a call attempt to destination client 18 by transmitting an INVITE request to SPS 14. SPS 14 acts as a proxy by relaying the INVITE message to client 18. If client 18 is available, client 18 transmits an OK message to client 12 via SPS 14. On the other hand, if SPS 14 does not recognize the IP address of client 18, SPS 14 may forward an INVITE message to RS 16. Subsequently, SPS 14 receives an alternative IP address for destination client 18 and provides that address to source client 12. Client 12 retransmits an INVITE message to client 18 using the address provided by RS 16. The above described transactions are conducted using SIP request messages and SIP response messages which are also referred to as call events. The application servers record each call event in a call event record. All of the call event records produced over a predetermined amount of time are compiled in a Call Event Record file (CER file). The CER file is subsequently transmitted to NMS 20. Network status changes, fault conditions, and billing data, in addition to call event records can also be reported to NMS 20 via the CER files. In this way, billing, troubleshooting, testing, and other back office functions resident in NMS 20 have access to the CER files.

Figure 2:
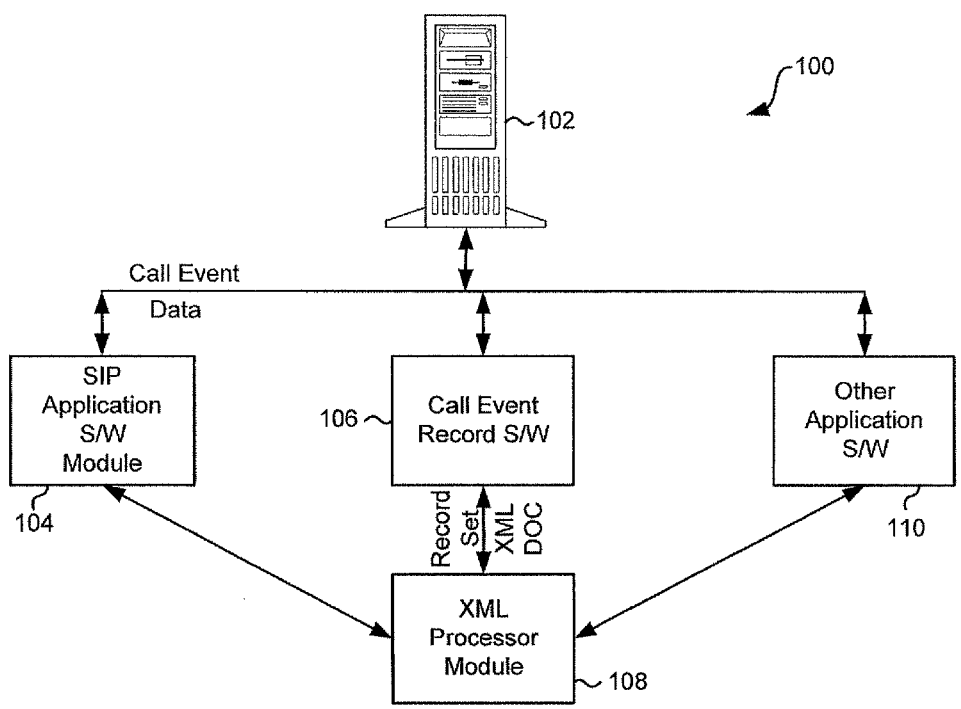
FIG. 2 is a block diagram of a SIP server in accordance with the present invention.

As embodied herein, and depicted in FIG. 2, a block diagram of SIP server 100 in accordance with the present invention is disclosed. Server 100 includes SIP application software module 104 disposed in the memory of server computer 102. The memory of server computer 102 also includes call event record module 106 and other application software modules 110. SIP application software 104 provides SIP functionality. Call Event Record module 106 creates call event records in response to SIP call events or other events. XML processor 108 reads XML documents providing access to their content and structure. XML processor 108 does its work on behalf of application software modules. SIP application software modules 104 disposed in SPS 14 and RS 16, respectively, can be written as proprietary application software on different hardware platforms as long as each server includes an XML processor.

Referring back to FIG. 2, module 104, module 106, module 108, and modules 110 work together by way of a set of application program interfaces. One important interface receives call event information from SIP module 104 and provides it to Call Event Record module 106. Another important interface receives a set of call event records from Call Event Record module 106 and returns a Call Event Record (CER) file from module 108. The CER file includes the set of call event records collected by module 16 over a predetermined period of time.

Figure 3:
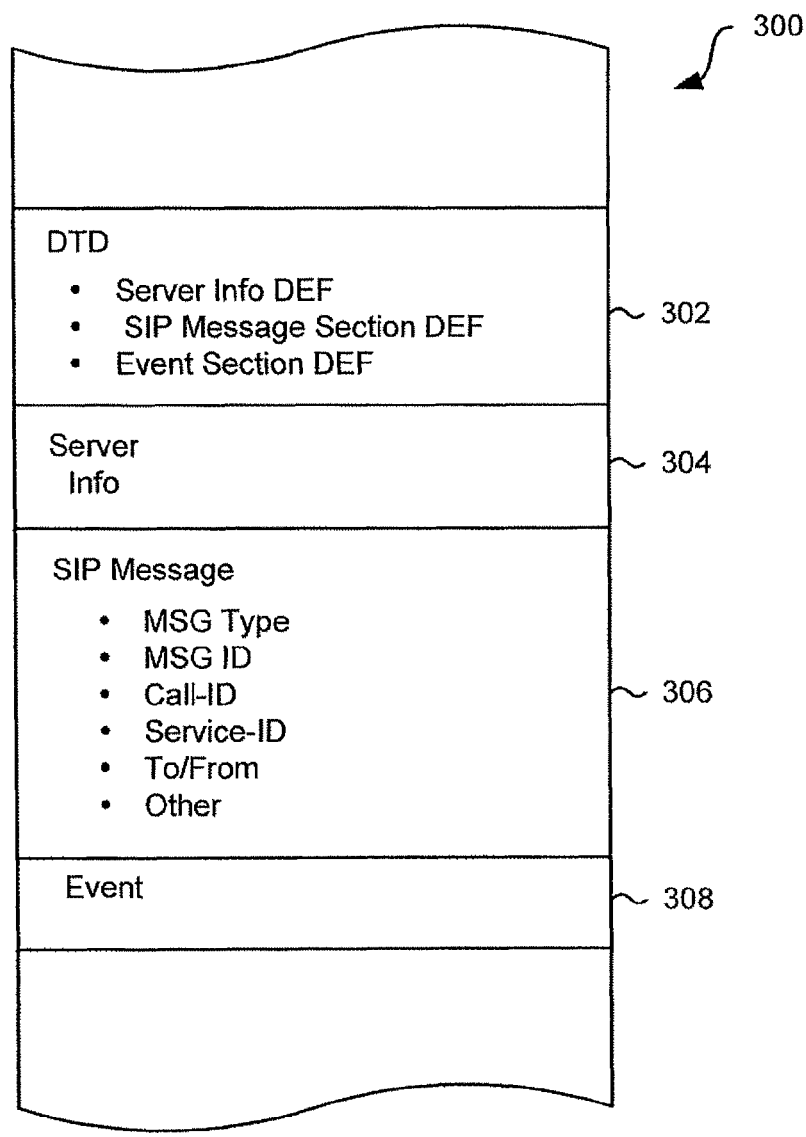
FIG. 3 is a diagrammatic depiction of the structure of a Call Event Record XML file.

As embodied herein, and depicted in FIG. 3, a diagrammatic depiction of the structure of CER file 300 in accordance with the present invention is disclosed. The CER file is an XML document. As discussed above, the XML document is the data exchange mechanism between different proprietary systems—whether they be applications, databases, or browsers. XML documents include storage units known as entities which contain parsed data and unparsed data. Parsed data includes "markup," which is used to encode a description of the documents storage layout and logical structure. The self describing feature of XML is one of its most important attributes—extensibility. When the application produces data, the XML processor is called to create an XML document having specific "tags." A tag is a string of unparsed data bracketed by delimiting punctuation. The XML processor in the receiving server parses the received XML document to determine the storage layout and logical structure of the XML document. However, the interpretation of the data is left to the application that calls XML processor 108.

Referring back to FIG. 3, CER file 300 has the following structure. It includes an XML document type declaration (DTD) section 302, server information section 304, SIP message type section 306, and event information section 308. DTD 302 provides a way of capturing the rules a designer adds to extend the core rules of XML syntax to thereby create a vocabulary to describe a particular event or situation. DTD section 302 also provides a way for an XML processor to unambiguously validate a particular XML document. DTD 302 provides data to describe the data in the tags. They describe the relationship between the tags found in the document, what attributes the tags are supposed to have, what attributes are default, and what values are mandatory. The XML processor module interprets DTD 302 accompanying the received XML document before providing the data to the application program.

Server information section 304 identifies the creator of CER file 300. This section appears only once in CER file 300. Since a particular server may provide specific services such as conferencing, instant messaging (IM), or voice mail, the service description as well as vendor information is provided by this section.

SIP message type section 306 appears for each call event record. This section 306 includes a message identifier field that identifies the exact type of message, e.g., whether it is an INVITE or a 200 OK message. SIP message type section 306 also includes a CALL-ID field which provides the CALL-ID header associated with a particular SIP message. SIP message type section 306 includes a service ID field that uniquely identifies the service instance associated with the SIP message. For example, if the application server is providing conferencing services, the service ID field identifies the particular conference corresponding to the SIP message. This allows one to obtain all messages exchanged during a specific conference within a specific time period. In another example, if the server is a voice mail system, the service ID would identify a particular voice mail box. In yet another example, the service ID would link together all messages and events for a given call established by a proxy server. SIP message type section 306 also includes a To/From field that records the IP address and port number of both the originating and receiving servers. In another embodiment, only one or the other will be present in this field. Finally, SIP message type section 306 includes an "other messages" field. This field records other portions of a SIP message deemed necessary depending on the type of server making the call event record. This information may include additional headers or it may be the actual message body of the SIP message.

CER file 300 also includes an Event Information Section 308 for each record. Event Information Section 308 records other events encountered in processing a particular SIP message. These other events include "INVITE TIMEOUT," "NON-INVITE TIMEOUT," "CONNECTION ERROR," "AUTHENTICATION PERFORMED," "FIND-ME FEATURE INVOKED," "DAP query sent," and etc. There may also be additional fields containing detailed information about an event. Of course, any modifications to this field will be defined in the DTD section.

Figure 4:
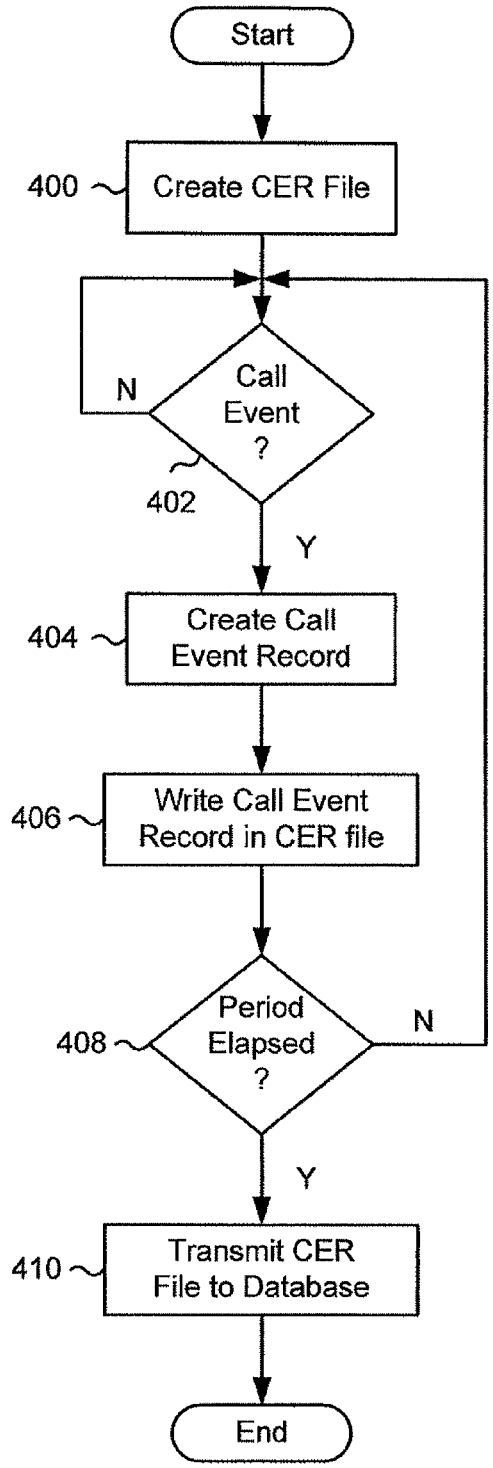
FIG. 4 is a chart showing a method for recording call events in accordance with the present invention.

As embodied herein, and depicted in FIG. 4, a chart showing a method for recording call events in accordance with the present invention is disclosed. In step 400, the application server creates CER file 300. The length of the file is configurable, that is, call event records and other data are written into the CER files for a predetermined period of time. After the time period elapses, a new CER file is started and the old file is archived by NMS 20. In step 302 the application server determines if there is a call event, such as an INVITE, or some other such SIP message event. If so, the application server creates a call event record. Subsequently, the XML processor is called and the call event record is written in the CER file using XML. In step 308, the application server determines if the configurable file time period has elapsed. If not, the process flow returns to step 302 and the application server waits for another call event to record. If the time period has elapsed, the CER XML document file is transmitted to NMS 20 (See FIG. 1).

Those of ordinary skill in the art will recognize that CER files can be employed for any events occurring within network 10. Calls placed between all or any combinations of SIP-phones, enterprise gateways, network gateways, DAL gateways, INCP gateways, SIP-voicemail servers, and SIP conferencing servers may employ the present invention. Those of ordinary skill in the art will also recognize that the present invention can be employed using any suitable type of transport network. Further, the present invention is applicable to any type of session that may be established including, but not limited to, telephony, video, audio, instant messaging, and etcetera. It is also contemplated that the present invention may be employed for billing, monitoring, management, or for any of a wide variety of services performed by the network.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A non-transitory computer readable medium storing instructions, the instructions comprising:
   one or more instructions which, when executed by one or more processors, cause the one or more processors to:
      receive, via a first application program interface and from a Session Initiation Protocol (SIP) application module, an event identifier associated with an occurrence of a first call event within a network,
         the SIP application module providing SIP functionality in the network;
      generate, using a first type of proprietary application, a first call event record based on the event identifier;
      receive, via a second application program interface, a set of call event records,
         the set of call event records including:
            the first call event record, and
            a second call event record associated with an occurrence of a second call event within the network,
               the second call event record being generated using a second type of application that is different from the first type of application;
      generate, based on the set of call event records, a call event file,
         the call event file including the set of call event records, and
         the call event file being generated as an Extended Markup Language (XML) document; and
      provide the call event file to a network management server,
         the call event file enabling the network management server to monitor the network using a third type of application that is different from the first type of application and the second type of application.

2. The non-transitory computer-readable medium of claim 1, where the first call event includes one of:
   receiving a SIP invite request,
   receiving a response to the SIP invite request,
   receiving a SIP redirection message,
   receiving a SIP proxying request,
   receiving a SIP proxying response message,
   receiving a SIP error message,
   a network fault condition, a transmission of billing information, or an event related to monitoring the telecommunications network.

3. The non-transitory computer-readable medium of claim 1, where the one or more instructions to generate the call event file include:

one or more instructions to include, in the XML document, a first server information tag that identifies an originating server associated with the first call event and a second server information tag that identifies an originating server associated with the second call event, the first server information tag and the second server information tag enabling the network management server to process the call event file to determine the originating server associated with the first call event and the originating server associated with the second call event.

4. The non-transitory computer-readable medium of claim 1, where the one or more instructions to generate the call event file include:

one or more instructions to include, in the XML document, a SIP message section that indicates that the first call event is associated with a SIP request and that the second call event is associated with a SIP response.

5. The non-transitory computer-readable medium of claim 1, where the one or more instructions to generate the call event file include:

one or more instructions to include, in the XML document, an event field identifying the occurrence of the first call event and the occurrence of the second call event.

6. The non-transitory computer-readable medium of claim 1, where the one or more instructions to generate the call event file include:

one or more instructions to include, in the XML document, a document type declaration section that includes information to enable the network management server to decode the XML document, the network management server using the document type declaration section to decode the XML document.

7. The non-transitory computer-readable medium of claim 1, where the instructions further comprise:

one or more instructions to determine an expiration of a particular time period, and where the one or more instructions to generate the call event file include:

one or more instructions to determine, based on the first call event record and the second call event record, that the first call event and the second call event occurred during the particular time period, and one or more instructions to generate the call event file based on determining that the first call event and the second call event occurred during the particular time period.

8. A method comprising:

receiving, by a device and via a first application program interface, an event identifier associated with an occurrence of a first call event within a network, the event identifier being received from a Session Initiation Protocol (SIP) application module, and the SIP application module providing SIP functionality in the network;

generating, by the device and using a first type of proprietary application, a first call event record based on the event identifier;

receiving, by the device and via a second application program interface, a set of call event records, the set of call event records including:

the first call event record, and a second call event record associated with an occurrence of a second call event within the network, the second call event record being generated using a second type of application that is different from the first type of application;

generating, by the device and based on the set of call event records, a call event file as an Extended Markup Language (XML) document, the call event file including the set of call event records; and providing, by the device, the call event file to a network management server, the call event file enabling the network management server to monitor the network using a third type of application that is different from the first type of application and the second type of application.

9. The method of claim 8, where each of the first call event and the second call event includes one of:

receiving a SIP invite request, receiving a response to the SIP invite request, receiving a SIP redirection message, receiving a SIP proxying request, receiving a SIP proxying response message, receiving a SIP error message, a network fault condition, a transmission of billing information, or an event related to monitoring the telecommunications network.

10. The method of claim 8, where generating the call event file includes:

including, in the XML document, a first server information tag that identifies an originating server associated with the first call event and a second server information tag that identifies an originating server associated with the second call event, the first server information tag and the second server information tag enabling the network management server to process the call event file to determine the originating server associated with the first call event and the originating server associated with the second call event.

11. The method of claim 8, where generating the call event file includes:

including, in the XML document, a SIP message section that indicates that the first call event is associated with a SIP request and that the second call event is associated with a SIP response.

12. The method of claim 8, where generating the call event file includes:

including, in the XML document, an event field identifying the occurrence of the first call event and the occurrence of the second call event.

13. The method of claim 8, where generating the call event file includes:

including, in the XML document, a document type declaration section that includes information to enable the network management server to decode the XML document, the network management server decoding the XML document based on the document type declaration section.

14. The method of claim 8, further comprising:
determining an expiration of a particular time period; and
where generating the call event file includes:
  determining, based on the first call event record and the second call event record, that the first call event and the second call event occurred during the particular time period, and
  generating the call event file based on determining that the first call event and the second call event occurred during the particular time period.

15. A device comprising:
one or more processors to:
  receive, via a first application program interface, an event identifier associated with an occurrence of a first call event within a network;
  generate, using a first type of proprietary application, a first call event record based on the event identifier;
  receive, via a second application program interface, a set of call event records,
    the set of call event records including:
      the first call event record, and
      a second call event record associated with an occurrence of a second call event within the network, the second call event record being generated using a second type of application that is different from the first type of application;
  generate, based on the set of call event records, an Extended Markup Language (XML) document,
    the XML document including the set of call event records; and
  provide the XML document to a network management server,
    the XML document enabling the network management server to monitor the network using a third type of application that is different from the first type of application and the second type of application.

16. The device of claim 15, where, when generating the XML document, the one or more processors are to:
  include, in the XML document, a first server information tag that identifies an originating server associated with the first call event and a second server information tag that identifies an originating server associated with the second call event,
  the first server information tag and the second server information tag enabling the network management server to process the XML document to determine the originating server associated with the first call event and the originating server associated with the second call event.

17. The device of claim 15, where, when generating the XML document, the one or more processors are to:
  include, in the XML document, a SIP message section that indicates that the first call event is associated with a SIP request and that the second call event is associated with a SIP response.

18. The device of claim 15, where, when generating the XML document, the one or more processors are to:
  include, in the XML document, an event field identifying the occurrence of the first call event and the occurrence of the second call event.

19. The device of claim 15, where, when generating the XML document, the one or more processors are to:
  include, in the XML document, a document type declaration section that includes information to enable the network management server to decode the XML document,
  the network management server decoding the XML document based on the document type declaration section.

20. The device of claim 15, where the one or more processors are further to:
  determine an expiration of a particular time period, and
  where, when generating the XML file, the one or more processors are to:
    determine, based on the first call event record and the second call event record, that the first call event and the second call event occurred during the particular time period, and
    generate the XML document based on determining that the first call event and the second call event occurred during the particular time period.

\* \* \* \* \*